(12) United States Patent
Haynes et al.

(10) Patent No.: US 8,756,520 B2
(45) Date of Patent: Jun. 17, 2014

(54) INDIVIDUAL INFORMATION ELEMENT ACCESS FOR UNOPENED OBJECTS

(75) Inventors: Thomas Richard Haynes, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 12/127,054

(22) Filed: May 27, 2008

(65) Prior Publication Data
US 2009/0300522 A1     Dec. 3, 2009

(51) Int. Cl.
*G06F 3/048*     (2013.01)
(52) U.S. Cl.
USPC .......................................................... 715/770
(58) Field of Classification Search
USPC .................. 715/770, 724, 769; 709/203, 219
See application file for complete search history.

(56) References Cited

U.S. PATENT DOCUMENTS

| | | | |
|---|---|---|---|
| 6,246,410 B1 * | 6/2001 | Bergeron et al. | 715/854 |
| 7,516,398 B2 * | 4/2009 | Yang | 715/230 |
| 7,631,268 B2 * | 12/2009 | McGowan et al. | 715/770 |
| 7,689,925 B2 * | 3/2010 | Hahn et al. | 715/770 |
| 2005/0149871 A1 * | 7/2005 | Broman et al. | 715/724 |
| 2005/0172241 A1 * | 8/2005 | Daniels et al. | 715/770 |
| 2006/0101064 A1 * | 5/2006 | Strong et al. | 707/102 |
| 2006/0218492 A1 * | 9/2006 | Andrade | 715/523 |
| 2007/0266333 A1 * | 11/2007 | Cossey et al. | 715/769 |
| 2007/0288859 A1 * | 12/2007 | Vuong et al. | 715/770 |
| 2008/0040663 A1 * | 2/2008 | Johnson et al. | 715/256 |
| 2008/0222548 A1 * | 9/2008 | Cohen et al. | 715/770 |
| 2009/0172581 A1 * | 7/2009 | Burling et al. | 715/770 |

* cited by examiner

*Primary Examiner* — Rashawn Tillery
(74) *Attorney, Agent, or Firm* — Lee Law, PLLC; Christopher B. Lee (57) ABSTRACT

A copy request is received that individually identifies an information element associated with a first unopened object to copy from the first unopened object. The individually identified information element is copied from the first unopened object. The information element copied from the first unopened object is stored to a memory.

20 Claims, 7 Drawing Sheets

INDIVIDUAL INFORMATION ELEMENT ACCESS FOR UNOPENED OBJECTS

BACKGROUND OF THE INVENTION

1. Field of the Invention

The present invention relates to systems and methods for copying and pasting content between source and target objects without copying or pasting the entire object or requiring the object to be opened for editing. More particularly, the present invention relates to individual information element access for unopened objects.

2. Related Art

Computer users that wish to copy the contents of one file to another file traditionally open both files for editing within, for example, a word processor. The word processor allows the user to perform editing operations in addition to allowing the users to copy and paste text between locations within one or more files.

To perform a copy operation between two files, the user must open the two files for editing. The user then selects text within one of the files and copies it to the clipboard. The user then switches to the other file, locates an insertion point for the text, and then pastes the copied text at the insertion point within the other file. The user then saves the file with the new text after the editing operation is completed and closes the two files.

BRIEF SUMMARY OF THE INVENTION

The subject matter described herein provides copy and paste capabilities for individual information elements and portions of editable content associated with unopened objects without requiring the entire object to be processed or requiring all of the editable content associated with the unopened objects to be opened for editing. The unopened objects include files, database records, database tables, or any other editable object. The individual information elements that may be identified for processing include text, metadata, editable content, and other information. A menu-based interface is provided for copying and pasting the individually identified information elements associated with the unopened objects. Defaults are provided for copying all editable content associated with an unopened object and for pasting the copied content to a top or bottom portion of another unopened object. Selecting an information element for copying or selecting an insert location for pasting results in a pop-up secondary window display of editable content associated with the unopened object to allow the selection to be made without opening the unopened object for editing. Changes to the unopened objects are automatically saved when the operation is completed.

A method includes receiving a copy request that individually identifies at least one of a plurality of information elements associated with a first unopened object to copy from the first unopened object, copying the individually identified at least one of the plurality of information elements from the first unopened object, and storing the information elements copied from the first unopened object to a memory.

A system includes a memory adapted to store individually identified information elements copied from unopened objects, and a computing device adapted to receive a copy request that individually identifies at least one of a plurality of information elements associated with a first unopened object to copy from the first unopened object, copy the individually identified at least one of the plurality of information elements from the first unopened object, and store the information elements copied from the first unopened object to the memory.

An alternative system includes a memory adapted to store individually identified information elements copied from unopened objects, and a computing device adapted to receive a copy request in response to a menu-based user interaction with a first icon representing a first unopened object within a graphical user interface that individually identifies at least one of a plurality of information elements associated with the first unopened object to copy from the first unopened object, copy the individually identified at least one of the plurality of information elements from the first unopened object, store the information elements copied from the first unopened object to the memory, receive a paste request that individually identifies at least one of a plurality of information elements associated with a second unopened object, wherein the paste request is received in response to a menu-based user interaction with a second icon representing the second unopened object within a graphical user interface, retrieve the information elements copied from the first unopened object from the memory, and paste the information elements copied from the first unopened object to the individually identified at least one of the plurality of information elements associated with the second unopened object.

A computer program product includes a computer useable medium including a computer readable program. The computer readable program when executed on a computer causes the computer to receive a copy request that individually identifies at least one of a plurality of information elements associated with a first unopened object to copy from the first unopened object, copy the individually identified at least one of the plurality of information elements from the first unopened object, and store the information elements copied from the first unopened object to a memory.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides copy and paste capabilities for individual information elements and portions of editable content associated with unopened objects without requiring the entire object to be processed or requiring all of the editable content associated with the unopened objects to be opened for editing. The unopened objects include files, database records, database tables, or any other editable object. The individual information elements that may be identified for processing include text, metadata, editable content, and other information. A menu-based interface is provided for copying and pasting the individually identified information elements associated with the unopened objects. Defaults are provided for copying all editable content associated with an unopened object and for pasting the copied content to a top or bottom portion of another unopened object. Selecting an information element for copying or selecting an insert location for pasting results in a pop-up secondary window display of editable content associated with the unopened object to allow the selection to be made without opening all of the editable content associated with the unopened object for editing. Changes to the unopened objects are automatically saved when the operation is completed.

For purposes of the present description, references to performing copy and paste operations on or accessing individually identifiable information elements or portions of content without opening the respective unopened objects for editing refers to performing the operations without opening the respective object within a native editing program for the type of object referenced. For example, if the unopened object is a text file, the reference refers to performing the respective operations without opening the unopened text file within a text editor or word processor. Similarly, for a spreadsheet file, the reference refers to performing the respective operations without opening the unopened spreadsheet file within a spreadsheet editing program. Additional examples are possible for other object types and all are considered within the scope of the present subject matter.

Figure 1:
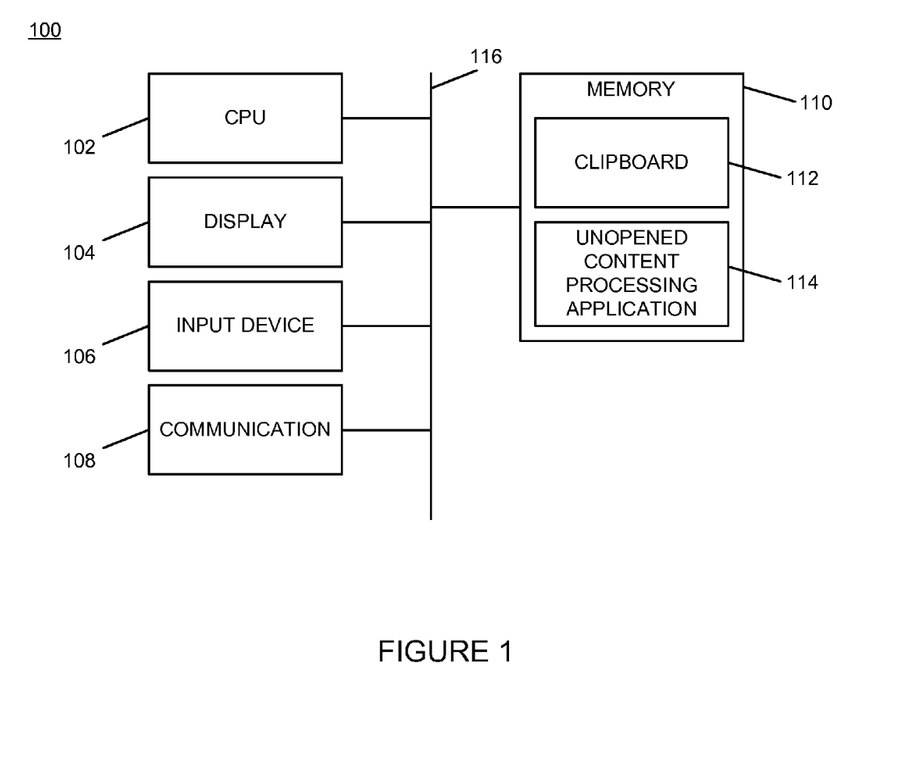
FIG. 1 illustrates an example of an implementation of a block diagram of a system for copying and pasting individually identifiable portions of content associated with unopened objects without copying the entire object or opening all of the content associated with the unopened objects for editing according to an embodiment of the present subject matter.

FIG. 1 illustrates an example of an implementation of a block diagram of a system 100 for copying and pasting individually identifiable portions of content associated with unopened objects without copying the entire object or opening all of the content associated with the unopened objects for editing. A central processing unit (CPU) 102 provides computer instruction execution, computation, and other capabilities within the system 100. The CPU 102 and the CPU 102 in conjunction with additional components to be described below may be considered generally as a computing device for purposes of the present description. A display 104 provides visual information to a user of the system 100 and an input device 106 provides input capabilities for the user.

For example, the input device 106 may include a computer keyboard, a keypad, a mouse, a pen, a joystick, or any other type of input device by which the user may select content represented on the display 104 and enter text and/or graphics into the system 100. As will be described in more detail below, a copy or paste operation may be performed upon individually identifiable portions of content associated with an object displayed on the display 104 without copying or pasting the entire object and without opening the object for editing.

A communication module 108 provides interconnection capabilities that allow the system 100 to communicate with other modules, such as via a network or other communication medium (not shown). The communication module 108 may include any electrical, protocol, and protocol conversion capabilities useable to provide the interconnection capabilities.

A memory 110 includes a clipboard 112 that stores copied content. The memory 110 also includes an unopened content processing application 114. The unopened content processing application 114 includes processing capabilities that perform the copy and paste operations for individually identifiable portions of content to and from unopened objects, as described in more detail below. The unopened content processing application 114 includes instructions executable by the CPU 102 for performing these functions. The unopened content processing application 114 may form a portion of an interrupt service routine (ISR), a portion of an operating system, or a portion of a separate application without departure from the scope of the present subject matter.

It is understood that the memory 110 may include any combination of volatile and non-volatile memory suitable for the intended purpose, distributed or localized as appropriate, and may include other memory segments not illustrated within the present example for ease of illustration purposes. For example, the memory 110 may include a code storage area, a code execution area, and a data area suitable for storage of the clipboard 112 and storage and execution of the unopened content processing application 114.

The CPU 102, the display 104, the input device 106, the communication module 108, and the memory 110 are interconnected via an interconnection 116. The interconnection 116 may include a system bus, a network, or any other interconnection capable of providing the respective components with suitable interconnection for the respective purpose.

Furthermore, components within the system 100 may be co-located or distributed within a network without departure from the scope of the present subject matter. For example, the components within the system 100 may be located within a stand-alone device, such as a personal computer (e.g., desktop or laptop) or handheld device (e.g., cellular telephone, personal digital assistant (PDA), email device, music recording or playback device, etc.). For a distributed arrangement, the display 104 and the input device 106 may be located at a terminal of a fuel pump, point of sale device, or kiosk, while the CPU 102 and memory 110 may be located at a local or remote server. Many other possible arrangements for components of the system 100 are possible and all are considered within the scope of the present subject matter.

The examples presented below use text, metadata, and file property copying and pasting within one system with one operating system without copying or pasting the entire object and without opening the source and target objects for ease of illustration purposes. However, it is understood that the present subject matter is not limited to copying and pasting of text, metadata, and file properties between two files on a single system. Accordingly, copying and pasting between objects that reside on different systems without copying or pasting the entire object and without opening the source and target objects for editing is also considered to be within the scope of the present subject matter.

Furthermore, the present subject matter is not limited to copying and pasting only text, metadata, and file property content. Copying and pasting of any individually identifiable information elements associated with a source or target object, respectively, is possible. For example, individually identifiable graphic elements associated with a graphic object and cells or groups of cells within a spreadsheet may also be processed. There are many other types of individually identifiable information elements associated with information storage objects and copying and pasting of any and all of these types of individually identifiable information elements is considered within the scope of the present subject matter. Accordingly, the use of text, metadata, and file properties within the following examples is for ease of illustration purposes.

FIGS. 2 through 6 illustrate an example of an implementation of a time progression for a user interface represented on the display 104 based upon user manipulation of the input device 106 in response to information presented within the user interface on the display 104. The time progression illustrated within FIGS. 2 through 6 is provided to facilitate understanding of the copy and paste capabilities associated with the present subject matter that are performed without copying or pasting the entire object and without opening source or target documents for editing. Detailed examples of processes for copying and pasting content without copying or pasting the entire object and without opening the source or target objects for editing are presented below beginning with FIG. 7.

Figure 2:
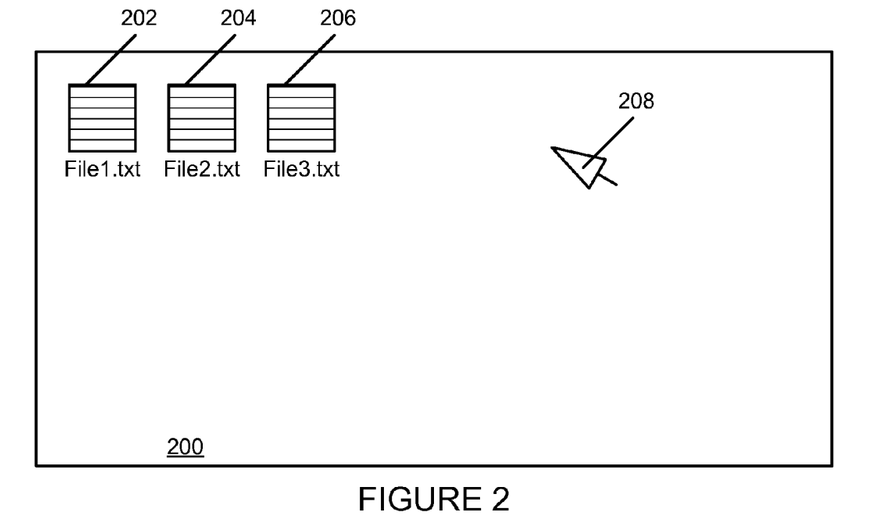
FIG. 2 illustrates an example of an implementation of a user interface that may be displayed on a display that is in an initial state where no source object has yet been selected for copying individually identifiable information elements from the source object without copying the entire object and without opening all of the content associated with the unopened source object for editing according to an embodiment of the present subject matter.

FIG. 2 illustrates an example of an implementation of a user interface 200 that may be displayed on the display 104 that is in an initial state where no source object has yet been selected for copying individually identifiable information elements from the source object without copying the entire object and without opening all of the content associated with the unopened source object for editing. As can be seen from FIG. 2, a file1.txt 202, a file2.txt 204, and a file3.txt 206 are represented as icons within the user interface 200. Details of controls associated with the user interface 200 are omitted for ease of illustration purposes. A cursor 208 is illustrated within the user interface 200 and allows a user of the user interface 200 to select objects and to invoke additional behavior associated with copying and pasting between objects without copying or pasting the entire objects and without opening the objects for editing.

Figure 3:
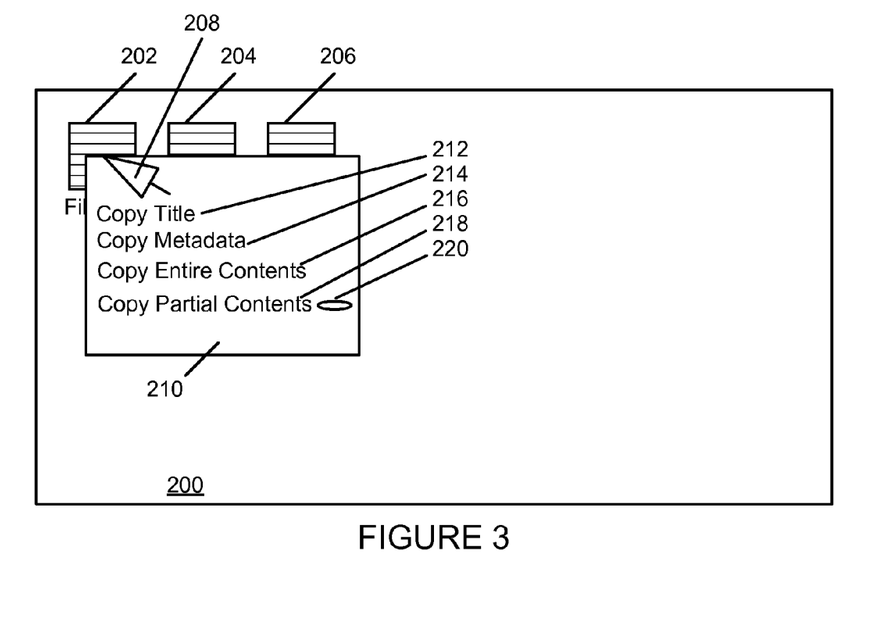
FIG. 3 illustrates an example of an implementation of a user interface after a user has placed a cursor over a file and right clicked with a mouse to open a pop-up menu that has options for copying individually identifiable information elements associated with an unopened source object without copying the entire source object and without opening all of the content associated with the unopened source object for editing according to an embodiment of the present subject matter.

FIG. 3 illustrates an example of an implementation of the user interface 200 after the user has placed the cursor 208 over the file1.txt 202 and right clicked with a mouse (not shown) to open a pop-up menu 210 that has options for copying individually identifiable information elements associated with the unopened source object without copying the entire source object and without opening all of the content associated with the unopened source object for editing. As can be seen from FIG. 3, the pop-up menu 210 includes several options.

A copy title option 212 allows the user to copy the title from the file1.txt 202 without opening the file1.txt 202 for editing. It should be noted that a title of an object may form a portion of file properties associated with the object. Accordingly, use of the copy title option 212 within the present example is for ease of illustration purposes and any other file property may be represented without departure from the scope of the present example. A copy metadata option 214 allows the user to copy metadata associated with the file1.txt 202 without opening the file1.txt 202 for editing. A copy entire contents option 216 allows the user to copy the entire contents of the file1.txt 202 without opening the file1.txt 202 for editing. A copy partial contents option 218 allows the user to copy a portion of the contents of the file1.txt 202 without copying the entire object and without opening the file1.txt 202 for editing. To facilitate selection of a portion of the contents of the file1.txt 202, an expansion icon 220 indicates that more options are available for the copy partial contents option 218 if the user selects the expansion icon 220.

As described above, text is used within the present example to represent the contents of the file1.txt 202. However, as also described above, the contents of the respective object may differ depending upon the object type, such as, with a graphic or spreadsheet object. Accordingly, the contents available for the copy entire contents option 216 and the copy partial contents option 218 may vary depending upon the type of object being accessed.

As can be seen from FIG. 3, the pop-up menu 210 allows the user to generate copy requests that individually identify information elements associated with the unopened objects to copy from the unopened object. The copy request generated by the pop-up menu 210 individually identifies the information elements associated with the unopened objects and causes the system 100 to copy the individually identified portions of the content associated with the unopened objects without copying the entire object and without opening all of the content associated with the unopened object for editing.

Unique information element types associated with each of the information elements copied from the unopened source object allow identification of the copied content. As will be described in more detail below, corresponding information element types are identified in association with paste operations and allow identification of the portions of content to be pasted to the target object based upon the portion copied from the source object. For example, metadata may be copied from an unopened source object and pasted to another unopened target object without copying or pasting the entire objects and without opening either object for editing based upon the information element types. Additionally, file properties may be copied from an unopened source object and pasted to another unopened target object without copying or pasting the entire objects and without opening either object for editing. The information element types associated with copied content may be stored to any convenient location within the memory 110.

Figure 4:
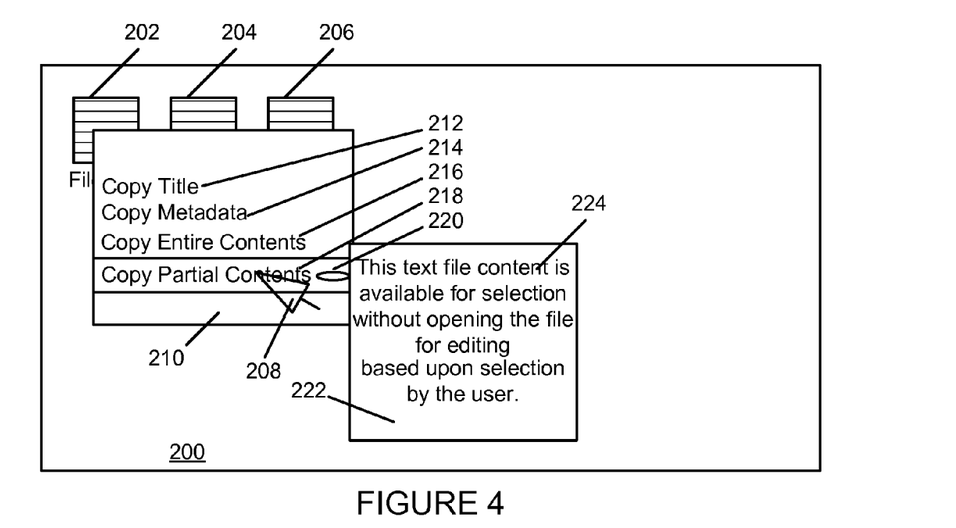
FIG. 4 illustrates an example of an implementation of a user interface after a user has placed a cursor over an expansion icon and right clicked with a mouse to open a secondary window that displays text associated with a file for selection and copying without copying the entire object and without opening all of the content associated with the unopened source object for editing according to an embodiment of the present subject matter.

FIG. 4 illustrates an example of an implementation of the user interface 200 after the user has placed the cursor 208 over the expansion icon 220 and right clicked with a mouse (not shown) to open a secondary window 222 that displays text associated with the file1.txt 202 for selection and copying without copying the entire object and without opening all of the content associated with the unopened source object for editing. As can be seen from FIG. 4, the secondary window 222 includes text 224 that is associated with the file1.txt 202. By highlighting one or more portions of the text 224 displayed within the secondary window 222, the user may identify one or more portions of the text 224 for copying without copying the entire object and without opening the file1.txt 202 for editing.

Figure 5:
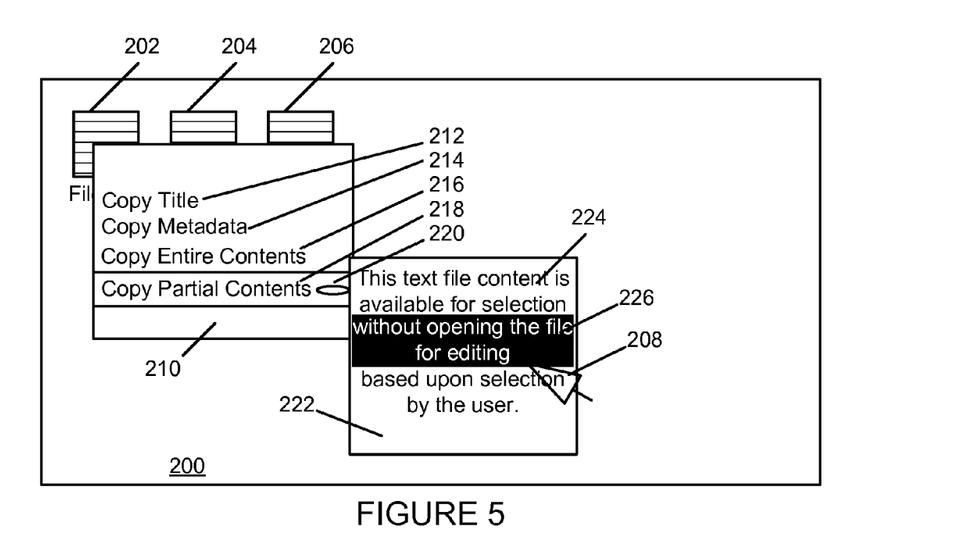
FIG. 5 illustrates an example of an implementation of a user interface after a user has selected a portion of text within a secondary window using a cursor to highlight and identify the portion of the text for copying without copying the entire object and without opening all of the content associated with the unopened source object for editing according to an embodiment of the present subject matter.

FIG. 5 illustrates an example of an implementation of the user interface 200 after the user has selected a portion 226 of the text 224 within the secondary window 222 using the cursor 208 to highlight and identify the portion 226 of the text 224 for copying without copying the entire object and without opening all of the content associated with the unopened source object for editing. The copy operation may be completed by selecting the portion 226 of the text 224 by right clicking the mouse (not shown) or by depressing a key, such as the enter key, on a keyboard or other form of the input device 106.

As described above in association with FIGS. 2 through 5, selection of any of the options 212 through 218 within the pop-up menu 210 results in the associated copy action occurring for individually identifiable information elements without copying the entire object and without opening the object file1.txt 202 for editing. Information elements copied from the file1.txt 202 may be stored to memory, such as on the clipboard 112, or stored in any other suitable manner that allows the information elements to be pasted into the same or another object.

Though not illustrated for ease of illustration purposes, many additional copy options are possible without copying an entire source file and without opening a source file for editing. For example, copying of other properties associated with a file, such as an author name, subject, company name or any other property associated with the file are also possible without opening the file for editing. Accordingly, all such additional copy options are considered to be within the scope of the present subject matter.

Figure 6:
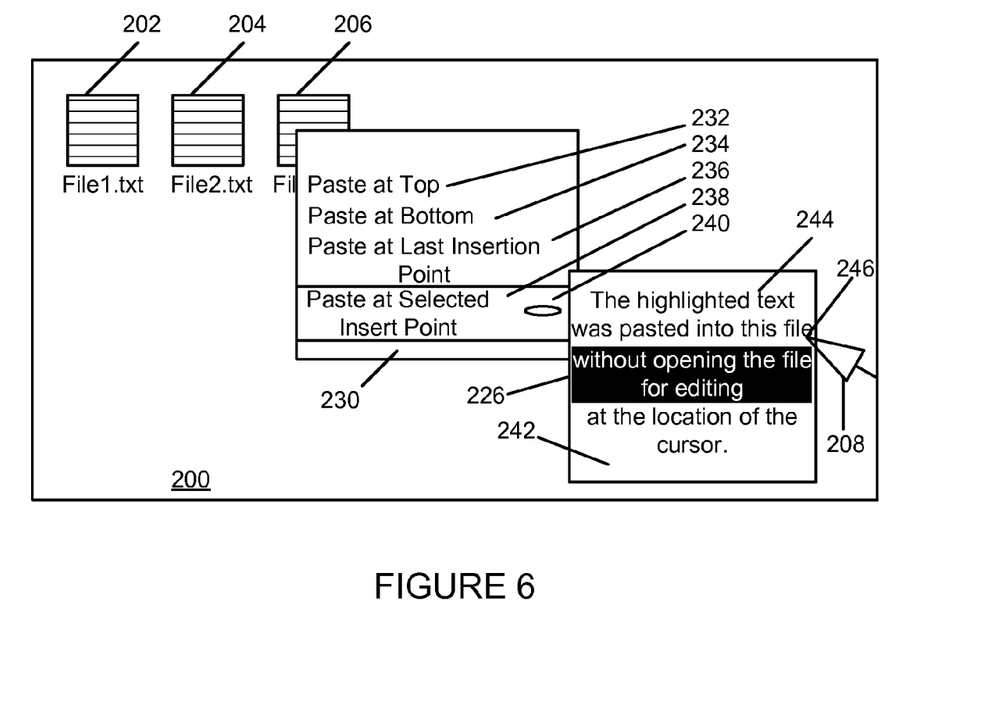
FIG. 6 illustrates example of an implementation of a user interface after a user has chosen to paste content, such as information elements, previously copied from an unopened source object to an unopened target object and has chosen to paste the copied content at a selected insert point without pasting the entire target object and without opening all of the content associated with the unopened target object for editing according to an embodiment of the present subject matter.

FIG. 6 illustrates an example of an implementation of a user interface 200 after the user has chosen to paste content, such as information elements, previously copied from an unopened source object to an unopened target object and has chosen to paste the copied content at a selected insert point without pasting the entire target object and without opening all of the content associated with the unopened target object for editing. Intervening stages of the paste menuing operations are omitted for brevity. Reference is made to FIGS. 2 through 5 above and the associated description for detailed sequencing of menuing operations capable of producing the subject matter illustrated within FIG. 6. A pop-up menu 230 is illustrated and was activated by the user right clicking over the file3.txt 206. As can be seen from FIG. 6, the pop-up menu 230 includes several options.

A paste at top option 232 allows the user to paste text from the clipboard 112 or other suitable storage location for copied text to the top of the file3.txt 206 without pasting the entire target object and without opening the file3.txt 206 for editing. A paste at bottom option 234 allows the user to paste text from the clipboard 112 or other suitable storage location for copied text to the bottom of the file3.txt 206 without pasting the entire target object and without opening the file3.txt 206 for editing. A paste at last insert point option 236 allows the user to paste text from the clipboard 112 or other suitable storage location for copied text to the last insert point associated with the file3.txt 206 without pasting the entire target object and without opening the file3.txt 206 for editing. It should be noted that the location of the last insert point may be stored as metadata associated with the file3.txt 206 and that this metadata may also be accessed without opening the file3.txt 206 for editing. A paste at selected insert point option 238 allows the user to paste content from the clipboard 112 or other suitable storage location for copied text to a selected location within the file3.txt 206 without pasting the entire target object and without opening the file3.txt 206 for editing. To facilitate selection of the insert point within the file3.txt 206, an expansion icon 240 indicates that more options are available for the paste at selected insert point option 238 if the user selects the expansion icon 240.

As can be seen from FIG. 6, the pop-up menu 230 allows the user to generate paste requests that individually identify information elements associated with the unopened objects to which to paste previously copied content to. The paste request generated by the pop-up menu 230 individually identifies the information elements associated with the unopened objects and causes the system 100 to retrieve the previously copied information elements and to paste to the individually identified information elements associated with the unopened target object without pasting the entire target object and without opening all of the content associated with the unopened object for editing.

Corresponding information element types associated with the unique information element types associated with each of the information elements copied from the unopened source object are identified in association with paste operations. The corresponding information element types allow identification of the portions of content to be pasted to the target object based upon the portion copied from the source object. For example, as described above, metadata may be copied from an unopened source object and pasted to another unopened target object without copying or pasting the entire objects and without opening either object for editing based upon the information element types. Additionally, file properties may be copied from an unopened source object and pasted to another unopened target object without copying or pasting the entire objects and without opening either object for editing.

As described above, it is assumed for purposes of the description of FIG. 6 that the user has selected the expansion icon 240 and that a secondary window 242 has opened with text 244 associated with the file3.txt 206. It is also assumed for purposes of this description that the user has completed a paste operation by selecting the insert point 246 within the text 244 with the cursor 208 by right clicking the mouse (not shown) or by depressing a key, such as the enter key, on a keyboard or other form of the input device 106. It should be noted that the text 244 is the non-highlighted text within FIG. 6. Accordingly, based upon these assumptions and notation, it can be seen from FIG. 6 that the portion 226 of the text 224 that was copied from the file1.txt 202 without opening the file1.txt 202 for editing has been pasted into the file3.txt 206 at the insert point 246 without opening the file3.txt 206 for editing. Furthermore, neither object was copied or pasted, respectively, in its entirety. Individually identified information elements were copied and pasted without opening either the source or target object for editing.

Additionally, the file3.txt 206 has been automatically saved in response to the paste operation. Alternatively, an additional mouse or keypad operation from the input device 106 may be used to allow the user to visually verify the inserted contents and confirm the save operation prior to saving the pasted content into the file3.txt 206.

As described above in association with FIGS. 2 though 6, the system 100 allows a user to identify source objects from which portions of content associated with the source objects may be copied without copying the entire source objects and without opening the source objects for editing. Additionally, target objects may be selected and portions of content may be pasted to portions of the target objects without pasting the entire target objects and without opening the target objects for editing.

Though the secondary window 222 and the secondary window 242 were illustrated within FIGS. 2 through 5 and within FIG. 6, respectively, without additional controls, this should not be considered limiting. Many additional controls are possible for selecting portions of text or for identifying insert points within objects that have not been opened for editing. For example, a scroll bar or other content navigation element may be associated with either the secondary window 222 or the secondary window 242 to allow the user to move within the text associated with an unopened source or target object. Accordingly, any such additional controls are considered within the scope of the present subject matter.

Figure 7:
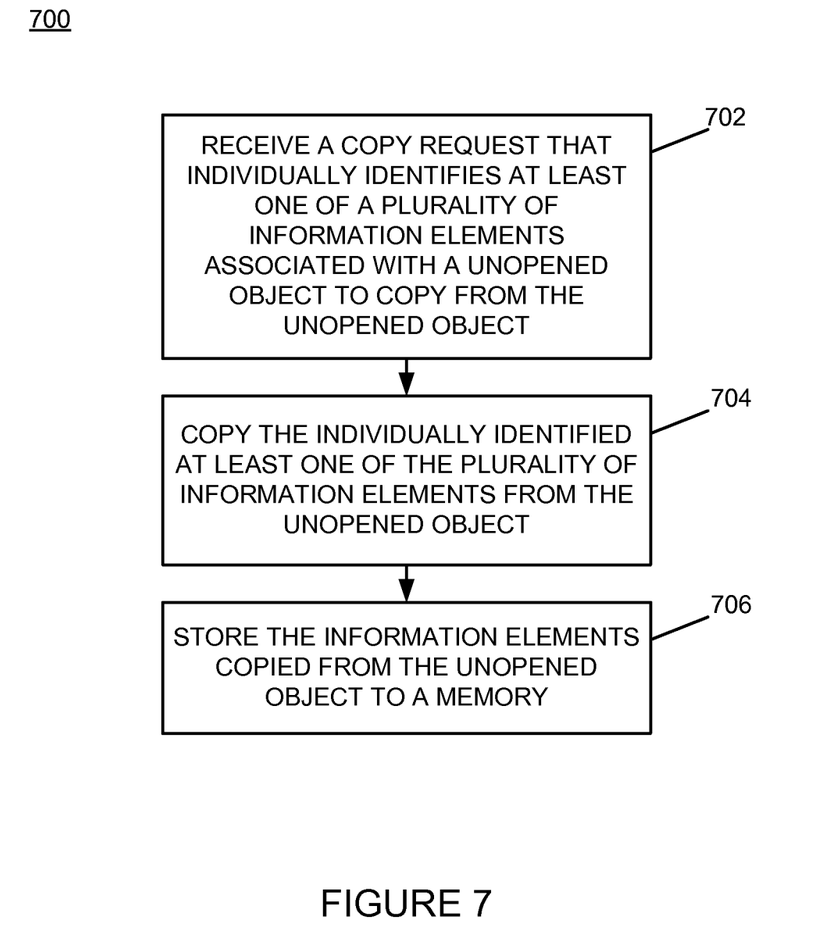
FIG. 7 illustrates an example of an implementation of a flow chart of a process for copying of individually identified information elements from unopened source objects without copying the entire object and without opening the unopened source objects for editing according to an embodiment of the present subject matter.

FIG. 7 illustrates an example of an implementation of a flow chart of a process 700 for copying of individually identified information elements from unopened source objects without copying the entire object and without opening the unopened source objects for editing. At block 702, the process 700 receives copy request that individually identifies at least one of a plurality of information elements associated with an unopened object to copy from the unopened object. The individually identified information elements include portions of content associated with the unopened object, such as metadata, file properties, and editable content. As such, the copy request received individually identifies portions of the content associated with the unopened object to be copied from the unopened object without copying the entire object and without opening all of the content associated with the unopened object for editing.

At block 704, the process 700 copies the individually identified at least one of the plurality of information elements from the unopened object. At block 706, the process 700 the process 700 stores the information elements copied from the unopened object to a memory. Accordingly, the process 700 copies individually identified information elements from an unopened object without copying the entire object and without opening all of the content associated with the unopened object for editing.

Figure 8:
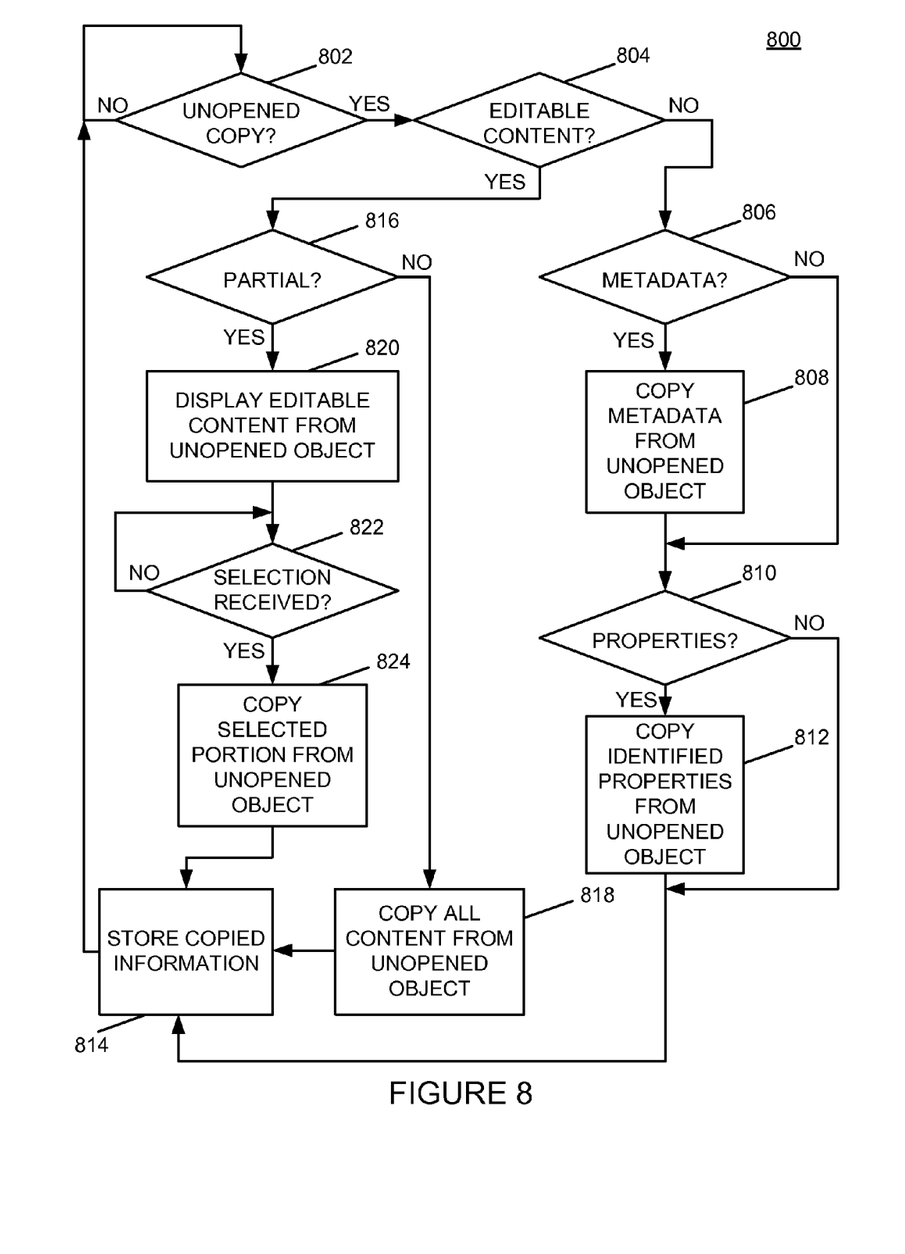
FIG. 8 illustrates an example of an implementation of a flow chart of a process for copying individually identified portions of content and information associated with an unopened source file without copying the entire object and without opening the unopened source file for editing according to an embodiment of the present subject matter.

FIG. 8 illustrates an example of an implementation of a flow chart of a process 800 for copying individually identified portions of contents and information associated with an unopened source file without copying the entire object and without opening the unopened source file for editing. The process 800 waits for a request to copy content or information from an unopened object at decision point 802.

When an unopened copy request occurs, the process 800 makes a determination as to whether the request is indicating that editable content associated with the unopened object is to be copied at decision point 804. The editable content may be text content for a text file, spreadsheet cells for a spreadsheet file, or any other editable content associated with the unopened object. When a determination is made that the request is not indicating that editable content associated with the unopened object is to be copied, the process 800 makes a determination as to whether metadata is to be copied from the unopened object at decision point 806.

When a determination is made that metadata is to be copied, the process 800 copies the metadata from the unopened object at block 808. After the metadata is copied or when a determination is made that metadata is not to be copied at decision point 806, the process 800 makes a determination as to whether identified properties are to be copied from the unopened object at decision point 810. The identified properties may include a title, an author name, a company name, and other file properties.

When a determination is made that identified properties are to be copied, the process 800 copies the identified properties from the unopened object at block 812. After the identified properties are copied or when a determination is made that identified properties are not to be copied at decision point 810, the process 800 stores the copied information, such as to the clipboard 112, at block 814 and returns to decision point 802 to await a new copy request associated with an unopened object.

When a determination is made at decision point 804 that editable content associated with the unopened object is to be copied, the process 800 makes a determination as to whether the copy request is for a partial copy at decision point 816. When a determination is made that a partial copy has not been requested, the process 800 copies all of the editable content associated with the unopened object at block 818, stores the copied information as described above at block 814, and returns to decision point 802 to await a new copy request associated with an unopened object.

When a determination is made that a partial copy has been requested at decision point 816, the process 800 displays editable content from the unopened object for selection, such as described above via the secondary window 222, at block 820. A scroll bar or other appropriate user interface navigation component may be used to allow the user to identified the portion of the editable content to be copied. The process 800 waits for a selection of the portion of editable content to be received at decision point 822. It should be noted that error handling, timeouts, and other processing may be performed in association with the process 800 in response to waiting for a selection of editable content and that these aspects are not illustrated for ease of illustration purposes.

When a selection of editable content from the unopened object is received, the process 800 copies the selected portion of the editable content at block 824. It should also be noted that there is no limitation on the amount of editable content that may be copied from the unopened object. For example, the user may select to copy all of the text of the unopened text file after requesting to copy a portion of the text without departure from the scope of the present subject matter. After the selected portion of the editable content of the unopened object is copied at block 824, the process 800 stores the copied information as describe above at block 814 and returns to decision point 802 to await a new copy request associated with an unopened object. Accordingly, the process 800 allows copying of individually identified information elements associated with a source file without copying the entire object and without opening the source file for editing.

Figure 9:
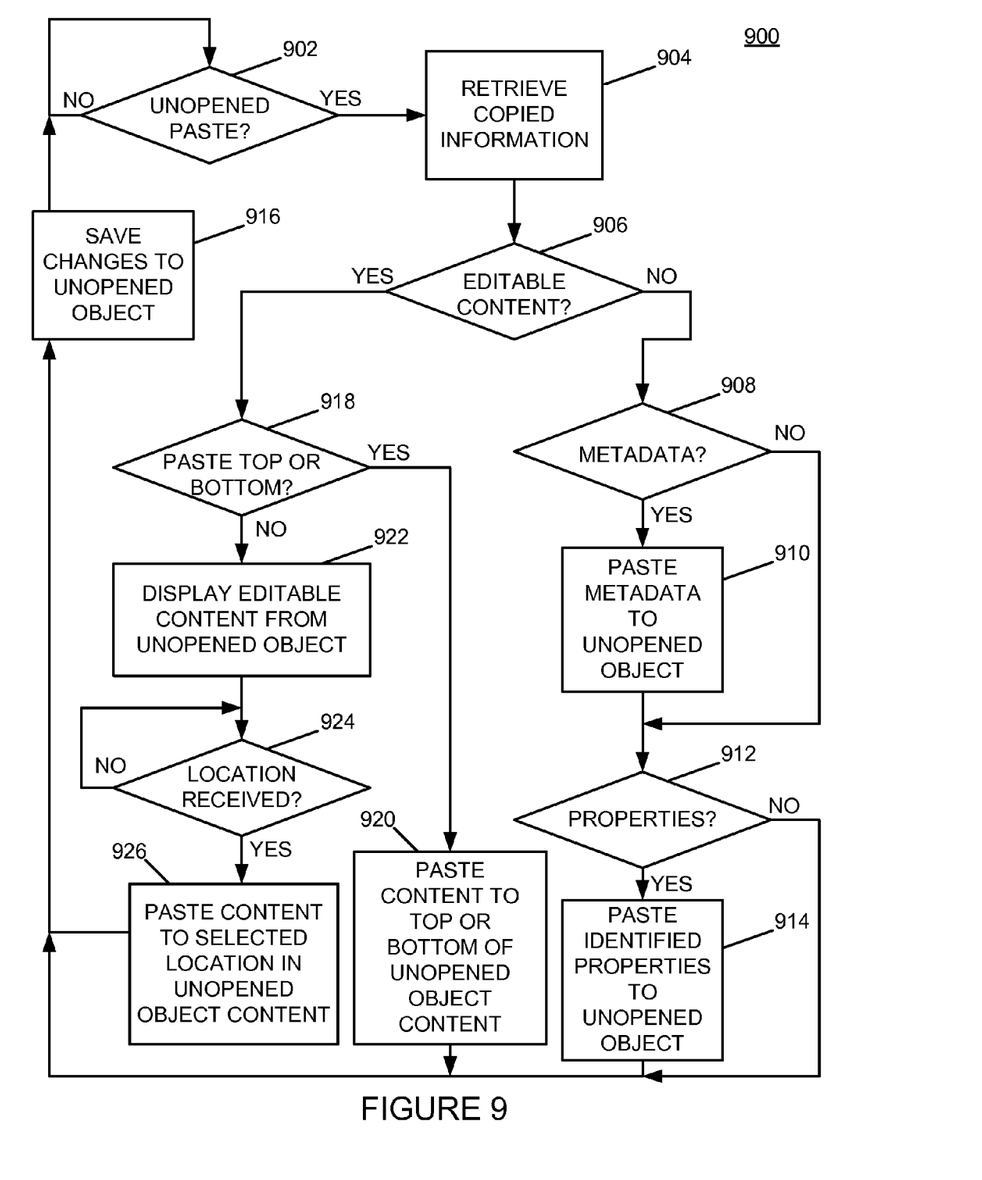
FIG. 9 is an example of an implementation of a flow chart of a process for pasting portions of content and information to an unopened target file without pasting the entire target file and without opening the unopened target file for editing according to an embodiment of the present subject matter.

FIG. 9 illustrates an example of an implementation of a flow chart of a process 900 for pasting individually identified portions of content and information to an unopened target file without pasting the entire target file and without opening the unopened target file for editing. The process 900 waits for a request to paste content or information to an unopened object at decision point 902.

When an unopened paste request occurs, the process 900 retrieves previously copied information, such as from the clipboard 112, at block 904. The process 900 makes a determination as to whether the request is indicating that editable content is to be pasted to the unopened object at decision point 906. The editable content may be text content for a text file, spreadsheet cells for a spreadsheet file, or any other editable content associated with the unopened object. When a determination is made that the request is not indicating that editable content is to be pasted to the unopened object, the process 900 makes a determination as to whether metadata is to be pasted to the unopened object at decision point 908.

When a determination is made that metadata is to be pasted, the process 900 pastes the metadata to the unopened object at block 910. After the metadata is pasted or when a determination is made that metadata is not to be pasted at decision point 908, the process 900 makes a determination as to whether a identified properties are to be pasted to the unopened object at decision point 912. The identified properties may include a title, an author name, a company name, and other file properties.

When a determination is made that identified properties are to be pasted, the process 900 pastes the identified properties to the unopened object at block 914. After the identified properties are pasted or when a determination is made that identified properties are not to be pasted at decision point 912, the process 900 automatically saves changes to the unopened object at block 916 and returns to decision point 902 to await a new paste request associated with an unopened object.

When a determination is made at decision point 906 that editable content is to be pasted to the unopened object, the process 900 makes a determination as to whether the request is to paste to the top or bottom of the unopened object at decision point 918. When a determination is made that the request is to paste to the top or bottom of the unopened object, the process 900 pastes the content to either the top or bottom of the unopened object as requested at block 920, automatically saves changes to the unopened object as described above at block 916, and returns to decision point 902 to await a new paste request associated with an unopened object.

When a determination is made that a paste to the top or bottom of the unopened object has not been requested at decision point 918, the process 900 displays editable content from the unopened object for selection of an insertion point, such as described above via the secondary window 242, at block 922. A scroll bar or other appropriate user interface navigation component may be used to allow the user to select the insertion point. The process 900 waits for a selection of an insertion point to be received at decision point 924. It should be noted that error handling, timeouts, and other processing may be performed in association with the process 900 in response to waiting for a selection of an insertion point and that these aspects are not illustrated for ease of illustration purposes.

When a selection of an insertion point within the editable content of the unopened object is received, the process 900 pastes the content to the selected location within the unopened object at block 926. It should also be noted that there is no limitation on the number of insertion points that may be selected within the unopened object. As such, the user may select to paste content to several locations within the unopened object after requesting to paste editable content without departure from the scope of the present subject matter. After the editable content has been pasted to the selected location within the unopened object at block 926, the process 900 automatically saves changes to the unopened object as described above at block 916 and returns to decision point 902 to await a new paste request associated with an unopened object. Accordingly, the process 900 allows pasting of individually identified information elements to a target file without pasting the entire object and without opening the target file for editing.

As described above in association with FIGS. 1 through 9, the example systems and processes provide individually information element access capabilities for accessing portions of content associated with unopened source or target objects without copying or pasting the entire object and without opening the unopened objects for editing. Many other variations and additional activities associated with individually information element access for unopened objects are possible and all are considered within the scope of the present subject matter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method comprising:
receiving, via an operating system level menu-based interface in response to detection of a user selection of a first menu option comprising a copy partial contents type identifier and detection of a user selection of a portion of displayed editable content associated with a first unopened data object, a copy request that individually identifies the selected portion of the displayed editable content associated with the first unopened data object to copy from the first unopened data object;
copying the individually identified portion of the displayed editable content from the first unopened data object; and
storing the identified portion of the displayed editable content copied from the first unopened data object to a memory.

2. The method of claim 1, where detection of a user selection of a first menu option comprises detection of an operating system level pop-up menu-based user interaction with a first icon representing the first unopened data object within a graphical user interface.

3. The method of claim 1, further comprising:
in response to detection of a selection via the operating system level menu-based interface of a second menu option comprising a title type identifier, copying a title from the first unopened data object;
in response to detection of a selection via the operating system level menu-based interface of a third menu option comprising a metadata type identifier, copying metadata from the first unopened data object; and
in response to detection of a selection via the operating system level menu-based interface of a fourth menu option comprising a file properties type identifier, copying file properties from the first unopened data object.

4. The method of claim 1, further comprising:
receiving, via the operating system level menu-based interface in response to detection of a user selection of a second menu option comprising a paste content type identifier, a paste request associated with a second unopened data object;
retrieving the copied portion of the displayed editable content copied from the first unopened data object from the memory; and
pasting the copied portion of the displayed editable content copied from the first unopened data object to the second unopened data object.

5. The method of claim 4, further comprising saving the second unopened data object automatically in response to pasting the copied portion of the displayed editable content copied from the first unopened data object to the second unopened data object.

6. The method of claim 4, where the second menu option further comprises a paste location type identifier and further comprising:
identifying a corresponding paste location within editable content associated with the second unopened data object.

7. The method of claim 6, where pasting the copied portion of the displayed editable content copied from the first unopened data object to the second unopened data object comprises pasting the copied portion of the displayed editable content copied from the first unopened data object to the identified paste location within the editable content associated with the second unopened data object.

8. A system comprising:
a memory adapted to store individually identified portions of displayed editable content copied from unopened data objects; and
a computing device programmed to:
receive, via an operating system level menu-based interface in response to detection of a user selection of a first menu option comprising a copy partial contents type identifier and detection of a user selection of a portion of displayed editable content associated with a first unopened data object, a copy request that individually identifies the selected portion of the displayed editable content associated with the first unopened data object to copy from the first unopened data object;
copy the individually identified portion of the displayed editable content from the first unopened data object; and
store the identified portion of the displayed editable content copied from the first unopened data object to the memory.

9. The system of claim 8, where detection of a user selection of a first menu option comprises detection of an operating system level pop-up menu-based user interaction with a first icon representing the first unopened data object within a graphical user interface.

10. The system of claim 8, where the computing device is further programmed to:
in response to detection of a selection via the operating system level menu-based interface of a second menu option comprising a title type identifier, copy a title from the first unopened data object;
in response to detection of a selection via the operating system level menu-based interface of a third menu option comprising a metadata type identifier, copy metadata from the first unopened data object; and
in response to detection of a selection via the operating system level menu-based interface of a fourth menu option comprising a file properties type identifier, copy file properties from the first unopened data object.

11. The system of claim 8, where the computing device is further programmed to:
receive, via the operating system level menu-based interface in response to detection of a user selection of a second menu option comprising a paste content type identifier, a paste request associated with a second unopened data object;
retrieve the copied portion of the displayed editable content copied from the first unopened data object from the memory; and
paste the copied portion of the displayed editable content copied from the first unopened data object to the second unopened data object.

12. The system of claim 11, where the computing device is further programmed to save the second unopened data object automatically in response to pasting the copied portion of the displayed editable content copied from the first unopened data object to the second unopened data object.

13. The system of claim 11, where the second menu option further comprises a paste location type identifier and the computing device is further programmed to:
identify a corresponding paste location within editable content associated with the second unopened data object.

14. The system of claim 13, where, in being programmed to paste the copied portion of the displayed editable content copied from the first unopened data object to the second unopened data object, the computing device is programmed to paste the copied portion of the displayed editable content copied from the first unopened data object to the identified paste location within the editable content associated with the second unopened data object.

15. A computer program product comprising a non-transitory computer useable storage medium including a computer readable program, wherein the computer readable program when executed on a computer causes the computer to:
receive, via an operating system level menu-based interface in response to detection of a user selection of a first menu option comprising a copy partial contents type identifier and detection of a user selection of a portion of displayed editable content associated with a first unopened data object, a copy request that individually identifies the selected portion of the displayed editable content associated with the first unopened data object to copy from the first unopened data object;
copy the individually identified portion of the displayed editable content from the first unopened data object; and
store the identified portion of the displayed editable content copied from the first unopened data object to a memory.

16. The computer program product of claim 15, where detection of a user selection of a first menu option comprises detection of an operating system level pop-up menu-based user interaction with a first icon representing the first unopened data object within a graphical user interface.

17. The computer program product of claim 15, where the computer readable program when executed on the computer further causes the computer to:
in response to detection of a selection via the operating system level menu-based interface of a second menu option comprising a title type identifier, copy a title from the first unopened data object;
in response to detection of a selection via the operating system level menu-based interface of a third menu option comprising a metadata type identifier, copy metadata from the first unopened data object; and
in response to detection of a selection via the operating system level menu-based interface of a fourth menu option comprising a file properties type identifier, copy file properties from the first unopened data object.

18. The computer program product of claim 15, where the computer readable program when executed on the computer further causes the computer to:
receive, via the operating system level menu-based interface in response to detection of a user selection of a second menu option comprising a paste content type identifier, a paste request associated with a second unopened data object;
retrieve the copied portion of the displayed editable content copied from the first unopened data object from the memory; and
paste the copied portion of the displayed editable content copied from the first unopened data object to the second unopened data object.

19. The computer program product of claim 18, where the computer readable program when executed on the computer further causes the computer to save the second unopened data object automatically in response to pasting the copied portion of the displayed editable content copied from the first unopened data object to the second unopened data object.

20. The computer program product of claim 18, where the second menu option further comprises a paste location type identifier and the computer readable program when executed on the computer further causes the computer to:
identify a corresponding paste location within editable content associated with the second unopened data object; and
where, in causing the computer to paste the copied portion of the displayed editable content copied from the first unopened data object to the second unopened data object, the computer readable program when executed on the computer causes the computer to paste the copied portion of the displayed editable content copied from the first unopened data object to the identified paste location within the editable content associated with the second unopened data object.

* * * * *